United States Patent Office 2,986,885
Patented June 6, 1961

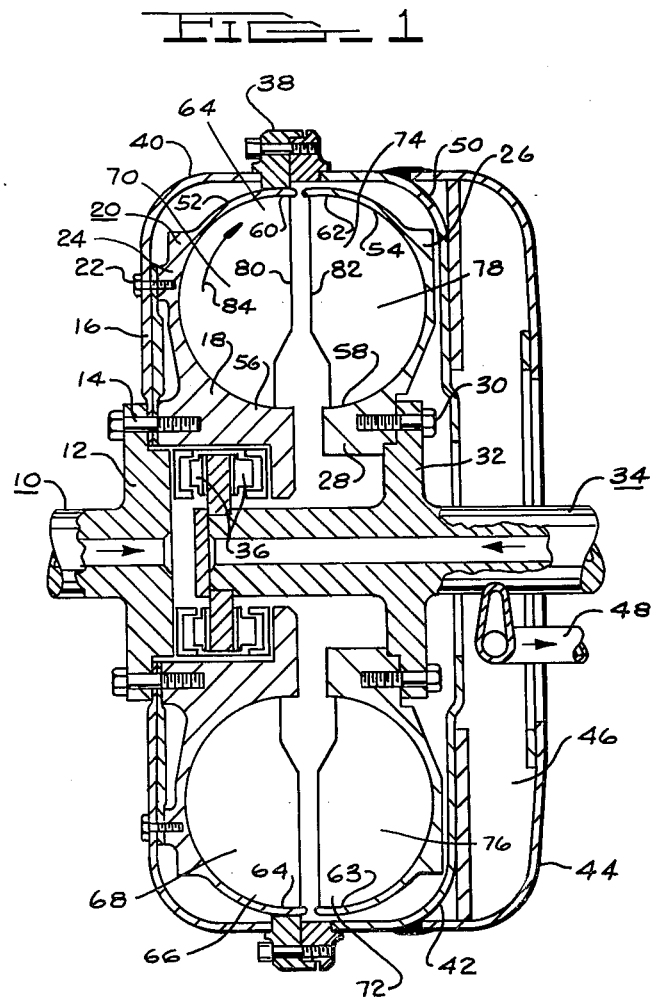

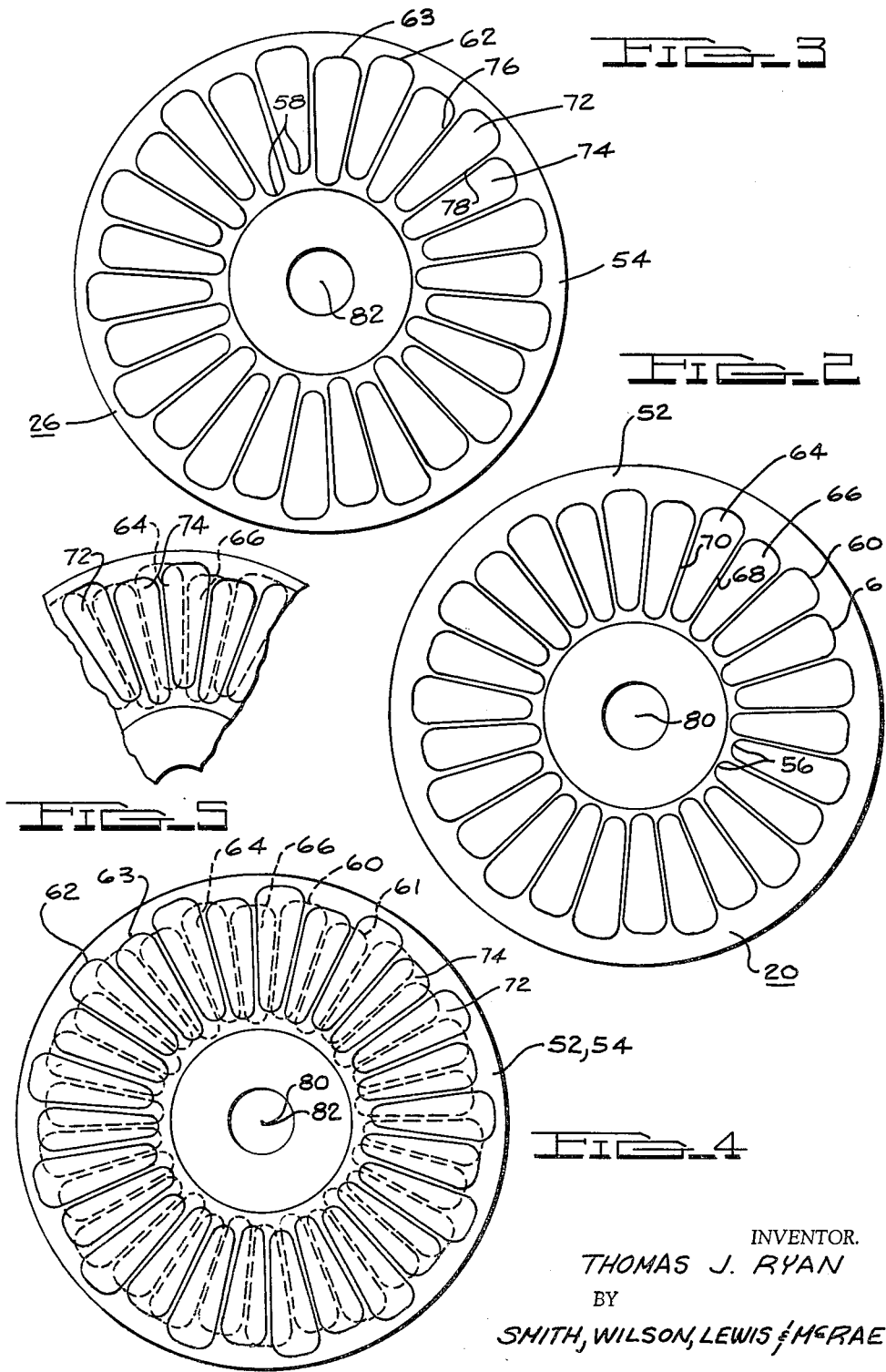

2,986,885
TOROIDAL CHAMBER TYPE FLUID COUPLING WITH SPECIFIC ROTOR DESIGN
Thomas J. Ryan, Detroit, Mich., assignor to American Radiator & Standard Sanitary Corporation, New York, N.Y., a corporation of Delaware
Filed May 9, 1958, Ser. No. 734,269
8 Claims. (Cl. 60—54)

This invention relates to fluid couplings and more particularly to an improved coupling wherein the fluid energizing and energy absorbing impeller and turbine members have radially offset vane pockets to provide mixed flow characteristics to the fluid vortex of the working circuit. Thereby improving the performance of the fluid coupling.

Fluid couplings have impeller and turbine members interposed between driving and driven shafts. The impeller and turbine members have confronting concave channels defining radially extending pockets formed by fluid energizing and energy absorbing vanes carried by the impeller and turbine members.

When the impeller is rotated, liquid in the cavities formed by the vanes and shell is given a rotational velocity, and centrifugal force causes the liquid to flow outwardly between the radial vanes. The axial component of the velocity of the liquid at the outer profile diameter carries the liquid across the gap into the turbine or runner. The runner speed is always less than the impeller speed so the centrifugal force on the liquid in the turbine or runner is less than in the impeller. The liquid is forced, by this unbalance to flow inwardly through the cavities in the turbine or runner member. The liquid leaves the turbine adjacent the inner profile diameter where it again enters the impeller to repeat the cycle. At the outer profile diameter the liquid in the impeller has received a rotational velocity and therefore has kinetic energy imparted to it. In traveling radially inwardly in the runner the liquid gives up most of its energy to the runner or turbine thereby imparting driving torque to the driven member.

The slip or loss of speed between the impeller and turbine is due to friction and turbulence losses. Based on a full circuit, the limit of torque transmission is reached when the slip is of such a magnitude that the runner shaft approaches stall. The torque imparted to the turbine is equal to the torque developed by the impeller.

When a fluid coupling is operating at minimum slip, the circuit circulation velocity is at its lowest value and it is therefore less turbulent. As the imposed load on the turbine side is increased the circulation velocity increases. The slip is a function of this circulation velocity.

The power transmitted depends on the coupling diameter, speed of impeller member, fluid density, amount of fluid circulated and the slip.

I have found that the impeller and turbine members can be materially strengthened by offsetting radially, adjacently positioned vane pockets of the impeller and turbine members to provide a mixed flow characteristic of the fluid circuit.

I have also found that the performance of the fluid drive can be materially improved by offsetting radially adjacent vane pockets of the impeller and turbine. This provides a mixed flow characteristic of the fluid circuit, and reduces the tendency toward circulation instability. This is especially true when the greatest amount of work is performed on a reduced quantity of fluid in the circuit and therefore the slip is high.

An object of my invention is therefore to provide a fluid coupling wherein adjacently positioned vane pockets of the impeller and turbine members are radially offset to provide improved fluid flow characteristics.

Another object of my invention resides in the provision of an improved fluid coupling having adjacently positioned vane pockets radially offset to provide structurally stronger impeller and turbine members.

Still another object of my invention is to provide an improved fluid coupling having fabricated impeller and turbine members wherein stress concentration in the blades is reduced by reinforcing the blade structure to increase the section of the impeller and turbine members in the areas of the inner and outer peripheries of the vane pockets.

Still another object of my invention resides in the provision of improved fluid energizing and energy absorbing vane members wherein the cross-sectional area of the vane sections are increased in the areas of their greatest stress concentration thereby increasing the resistance to vibrational stresses.

Another object of my invention is to provide a mixed flow fluid coupling wherein the effective discharge of circulating fluid from the impeller can cross over smoothly into the turbine.

Yet another object is to provide a fluid coupling having impeller and turbine members embodying increased radial vane surfaces to provide greater energy absorbing areas thereby increasing its efficiency.

A further object of my invention is to provide a fluid coupling wherein shock stresses exerted on the vanes are minimized by positioning adjacent vane pockets of the impeller and turbine members radially relative to each other to diffuse radially the fluid flow and the resultant shock stresses caused as the impeller and turbine members move circumferentially relative to each other.

Still another object of my invention is to provide a radially diffused cutting of the circulating liquid as the vanes of the impeller and turbine members move circumferentially relative to each other due to slippage as the impeller overspeeds the turbine thereby minimizing shock stresses on the vanes.

Yet another object of my invention is to minimize turbulence and shock waves in fluid couplings by diffusing radially the flow of fluid from the impeller to the turbine and vice versa as fluid circulates between the impeller and turbine members thereby breaking up shock stresses and improving performance.

Other objects and advantages of my invention will be apparent from the following detailed description, considered in conjunction with the accompanying drawings submitted for purposes of illustration only and not intended to define the scope of the invention, reference being had for that purpose to the subjoined claims.

In the drawings wherein similar reference characters refer to similar parts throughout the several views:

FIG. 1 is sectional view of a fluid coupling embodying my invention.

FIG. 2 is a front elevational view of an impeller member showing the radially spaced vane pockets.

FIG. 3 is a view similar to FIG. 2 showing the turbine member having radially spaced vane pockets.

FIG. 4 is an overlay diagrammatic view showing in dotted lines the vane pockets of the impeller member and showing in full lines the vane pockets of the turbine members.

FIG. 5 is a fragmentary view similar to FIG. 4 showing a modified form of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now more particularly to FIG. 1 it will be noted that a driving shaft 10 has a flange 12 connected by bolts 14 to a flange member 16 and to a hub section 18 of an impeller or primary rotor 20. The flange 16 is connected through bolts 22 with a web 24 carried by the impeller. A turbine or secondary rotor 26 is disposed in cooperating relation relative to the impeller 20 and has a hub section 28 connected through bolts 30 with a flange 32 carried by a driven shaft 34. The driven shaft 34 is positioned axially by bearings 36 in the hub section 18 of the impeller 20.

The impeller 20 may, for example, have an outer peripheral flange 38 connected to an axial housing section 40 of the flange member 16 and to an inner casing 42 and an outer casing 44 forming therebetween a chamber 46 for the reception of a scoop tube 48. The quantity of liquid within the working circuit between the impeller and turbine members 20 and 26, is controlled by the position of the scoop tube 48 since apertures 50 provided in the inner casing 42 interconnect the space within the housing sections 40 and 42 with the chamber 46. Under most operating conditions the level of the liquid in the casing space is the same as that in the working circuit.

In operation, scoop tube 48 discharges its collected liquid to a sump (not shown) from where it may be returned to the working circuit via a cooler (not shown) and either or both of the illustrated axial passages in shafts 10 and 34. It will be understood that these shafts are provided with supporting bearings in their non-illustrated portions, and that cooled liquid from the cooler can be circulated through said bearings before introduction thereof to the axial passages. Suitable outwardly radiating passages (not shown) can be provided in shaft 34 and impeller hub 18 to conduct the liquid from the axial passages to the working circuit.

The impeller and turbine members 20 and 26 have shells 52 and 54 contoured to provide confronting concave chambers extending from their inner profile diameters 56 and 58 to their outer profile diameters 60 and 62 respectively.

As best shown in FIG. 2 the impeller 20 is formed with a plurality of circumferentially spaced recurring fluid energizing vane pockets 64 and 66 separated from each other by radially extending vanes 68 and 70. Referring to FIG. 3 it will be noted that the turbine 26 is formed with a plurality of circumferentially recurring energy absorbing vane pockets 72 and 74 also separated from each other by radially extending vanes 76 and 78. As shown in FIGS. 1 to 3 the vanes 68 and 70 of the impeller 20 and the vanes 76 and 78 of the turbine 26 have substantially flat radially extending surfaces 80 and 82 respectively extending substantially perpendicularly to the axes of the driving and driven shafts 10 and 34.

As illustrated in FIGS. 2 to 4 the impeller and turbine vanes have thickened and rounded sections at the inner profiles 56 and 58 and at their outer profiles 60 and 62 to provide well rounded vane pockets having increased sections adjacent their inner and outer peripheries of the vane pockets where the stresses resulting from the deflection of the fluid to change its course from radial to axial and vice versa are concentrated as the fluid circulates from the impeller to the turbine and back again. These increased sections provide greater strength at the areas of highest concentrations of stresses and thus minimize concentration of vibrational forces.

As shown more clearly in FIGS. 2 and 3 alternate vane pockets 64 and 66 of the impeller 20 and alternate pockets 72 and 74 of the turbine 26 are offset radially to diffuse the flow of fluid from the impeller to the turbine adjacent the outer profile diameters 60 and 62 and through the turbine pockets radially inwardly toward the inner profile diameters 58 and 56 and across onto the impeller smoothly minimizing the concentration of stresses.

Referring now more particularly to FIG. 2 it will be noted for example that the alternately spaced impeller vane pockets 64 are spaced to position their outer profiles 60 at a fixed distance from the center 80 of the impeller 20 and that the other set of alternately spaced impeller vane pockets 66 have their outer profiles 61 spaced at a lesser distance from the center 80 of the impeller 20.

As illustrated in FIG. 3 it will be noted for example that the alternately spaced turbine vane pockets 72 are so proportioned as to position their outer profiles 62 at a greater distance from the center 82 of the turbine rotor 26 than the corresponding surface 60 of the impeller 20. The other set of alternately spaced vane pockets 74 of the turbine 26 are spaced from the center 82 to position their outer profiles 63 at the same distance from the center 82 of the turbine as the corresponding surface 60 of the impeller 20.

It will thus be apparent that in the embodiment illustrated, the vane pockets 64 of the impeller positioned farthest from the center 80 of the impeller are aligned with the set of turbine pockets 74 which are spaced radially inwardly with respect to the center 82 of the turbine 26. The outer set of turbine vane pockets 72 are positioned radially outwardly from the outer set of impeller vane pockets 64, and radially outwardly from the inner set of impeller vane pockets 66.

This radial disposition of the impeller and turbine pockets results in diffusing the axial flow of liquid from the impeller 20 radially, and likewise the outer peripheries of the turbine pockets are spaced radially relative to each other to spread the impact loads of the circulating fluid. It will be noted that in the embodiment of FIGS. 2 to 4 the inner group of impeller vane pockets 66 are spaced radially inside of both of the sets of turbine vane pockets 72 and 74, and that the outer group of impeller vane pockets 64 are aligned radially with the inner group of the turbine vane pockets 74, the outer group of turbine vane pockets 72 being spaced radially outside of the outer group of impeller pockets 64. Stresses are thus materially reduced and stronger impeller and turbine members result wherein the impeller vanes 76 and 78 and of the turbine vanes 68 and 70 are materially strengthened at stress concentration points.

As the impeller 20 rotates, the vanes 68 and 70 force the liquid in the impeller pockets 64 and 66 to rotate with the impeller shell 52 and centrifugal force is imparted to the liquid as it flows outwardly in the vane pockets 64 and 66 between the impeller vanes 68 and 70. The shell 52 retains and directs the liquid in the pockets 64 and 66 and induces it to move in a circular path as shown by the arrow 84 in FIG. 1. The liquid is accelerated as it moves radially outwardly, and it is deflected by the curvature of the impeller shell 52 to flow axially into the turbine 26. The liquid discharged axially from the impeller 20 flows into the turbine pockets 72 and 74 formed between the vanes 76 and 78 of the turbine 26 and is deflected by the turbine shell 54 to flow radially inwardly in the turbine pockets 72 and 74 toward the inner profile 58 of the turbine 26. As the circulating liquid is forced inwardly in the turbine 26, torque is extracted from the liquid and it is transferred through the turbine 26 and flange 32 to the driven shaft 34.

A continuous circulation of liquid from the impeller to the turbine and back to the impeller results from the fact that the liquid is forced to flow inwardly in the turbine 26 by the force exerted thereon by additional liquid being energized and forced radially outwardly and axially by centrifugal force imparted thereto by the impeller 20.

In fluid couplings the impeller 20 rotates at a speed somewhat faster than the speed of rotation of the turbine 14. This difference in speed of the impeller and turbine members is referred to as slippage. The slippage is the greatest or is maximum when the impeller is rotated and the turbine is standing still. After the torque imparted to the turbine overcomes the load to which the turbine is subjected the turbine starts to rotate, and as the turbine speeds up the degree of slippage decreases.

The degree of slippage between the impeller and turbine of a fluid coupling is dependent in part on the quantity of liquid in the fluid circuit. If the fluid circuit is substantially full of liquid the degree of slippage will be at a minimum after the device has come up to speed. The torque imparted to the turbine is equal to the torque developed by the impeller and is a function of the load on turbine shafts. It is therefore dependent in part on the quantity of liquid in the circuit.

As the adjacent radially extended edges 80 and 82 of the impeller and turbine vanes pass each other due to the slippage between the impeller and turbine, the vanes shear or cut the body of liquid flowing from the impeller to the turbine adjacent the outer profiles 60 and 62 of the impeller and turbine members and at the inner profiles 58 and 56 as the liquid flows from the turbine 26 back into the impeller 20. Cyclic stresses are thus encountered as the vanes of the impeller pass the vanes of the turbine.

I have discovered that by offsetting radially alternately spaced vane pockets of the impeller and turbine members the flow of liquid from the impeller is diffused radially whereupon the cyclic stress pattern is progressively changing and tends to eliminate a resonance frequency as the vanes move circumferentially relative to each other. The points of support of the vanes are offset and stress concentration points are offset to materially strengthen the structure.

Referring to FIG. 4 the impeller vane pockets 64 and 66 are illustrated in dotted lines to show their relation to the turbine vane pockets 72 and 74 shown in full lines. It will be noted that in the operation of this device as the impeller vane pockets 64 and 66 move circumferentially with respect to the turbine vane pockets 72 and 74 the fluid turbulence is minimized because of the radial diffusion of the fluid.

It is of course within the scope of my invention to employ a different number of vane pockets on the impeller and turbine members to avoid the simultaneous circumferential movement of all of the vane pockets of the impeller and turbine members.

In the embodiment illustrated in FIG. 5 the impeller pockets 64 and 66 are spaced radially from the centers 80 and 82 the same distances as the turbine pockets 72 and 74 respectively. With this embodiment of my invention the same tooling may be employed in the formation of the impeller and turbine members. This radial offsetting of the vanes provides a baffling effect which functions as a load limiting device.

It will be apparent that the impeller and turbine members may be formed in any desired manner as by being cast, milled or fabricated.

My invention is not limited to the radial disposition of alternately spaced vane pockets but comprehends the positioning of a group of symmetrically spaced vane pockets radially relative to other groups of symmetrically spaced vane pockets of one or both of the impeller and turbine members. It will also be apparent that the impeller and turbine members may be of any desired size, the dimensions specified herein being for purposes of illustration only.

The operation of my improved fluid coupling is substantially the same regardless of whether the impeller and turbine members rotate in the clockwise or in the counterclockwise directions.

I claim:
1. A fluid coupling comprising an impeller element having vanes defining circumferentially spaced pockets, and a juxtaposed turbine element having vanes defining circumferentially spaced pockets for receiving fluid from the impeller element pockets and transferring same back thereto; the entrance-forming back surfaces of at least some of the turbine element pockets being offset radially outward of the exit-forming back surfaces of at least some of the impeller element pockets, whereby to accommodate a radial diffusion of fluid as it passes from the impeller element into the turbine element.

2. The combination of claim 1 wherein other ones of the turbine element pockets have their entrance-forming back surfaces in axial registry with the aforementioned exit-forming surfaces.

3. The combination of claim 1 wherein other ones of the turbine element pockets have their entrance-forming back surfaces spaced radially inward of the first mentioned entrance-forming surfaces; said runner element having a circular peripheral outline when viewed in the axial direction whereby the structural wall portions defining the last mentioned back surfaces are of greater radial thickness than the structural wall portions defining the first mentioned back surfaces.

4. A fluid coupling comprising an impeller element having vanes defining circumferentially spaced fluid pockets, and a juxtaposed turbine element having vanes defining circumferentially spaced pockets for receiving fluid from the impeller element pockets and transferring same back thereto; the entrance-forming back surfaces of at least some of the pockets in one of the elements being offset radially of the exit-forming back surfaces of at least some of the pockets in the other element.

5. The combination of claim 4 wherein the radial offset is in a direction such that the structures defining the aforementioned entrance-forming surfaces constitute baffles to the fluid as it passes into said one element.

6. The combination of claim 4 wherein the radial offset is in a direction such that the aforementioned entrance-forming surfaces define free spaces for accommodating radial diffusion of the fluid at it passes into said one element.

7. A fluid coupling comprising an impeller element having vanes defining circumferentially spaced pockets, and a juxtaposed turbine element having vanes defining circumferentially spaced pockets for receiving fluid from the impeller element pockets and transferring same back thereto; all of the pockets having the same radial dimension; some of the impeller element pockets and some of the turbine element pockets having the same predetermined radial spacing from the coupling axis; others of the impeller element pockets having less than said predetermined radial spacing from the coupling axis, and others of the turbine element pockets having a radial spacing from the coupling axis greater than said predetermined value.

8. The combination of claim 7 wherein the radially innermost portions of the profiles of the impeller element vanes are cut back to facilitate the entry of fluid into the impeller element from the turbine element.

References Cited in the file of this patent

UNITED STATES PATENTS

| | | |
|---|---|---|
| 2,599,461 | Koskinen | June 3, 1952 |
| 2,652,782 | Herndon et al. | Sept. 22, 1953 |
| 2,687,013 | Sinclair | Aug. 24, 1954 |